US011999878B2

(12) United States Patent
Dong et al.

(10) Patent No.: US 11,999,878 B2
(45) Date of Patent: *Jun. 4, 2024

(54) ADHESIVE, BEARING WITH THE ADHESIVE, AND METHODS OF MAKING

(71) Applicant: SAINT-GOBAIN PERFORMANCE PLASTICS CORPORATION, Solon, OH (US)

(72) Inventors: Jing Dong, Shrewsbury, MA (US); Nafih Mekhilef, Shrewsbury, MA (US); Dongyeop Shin, Irvine, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/172,535

(22) Filed: Feb. 10, 2021

(65) Prior Publication Data

US 2021/0163798 A1 Jun. 3, 2021

Related U.S. Application Data

(63) Continuation of application No. 16/370,498, filed on Mar. 29, 2019, now Pat. No. 10,947,427.

(Continued)

(51) Int. Cl.
*F16C 33/20* (2006.01)
*C09J 123/08* (2006.01)
*C09J 127/18* (2006.01)
*C09J 127/24* (2006.01)
*C09J 129/10* (2006.01)

(52) U.S. Cl.
CPC ....... *C09J 129/10* (2013.01); *C09J 123/0892* (2013.01); *C09J 127/18* (2013.01);
(Continued)

(58) Field of Classification Search
CPC .. C09J 129/10; C09J 127/18; C09J 123/0892; F16C 33/203; F16C 2202/20;
(Continued)

(56) References Cited

U.S. PATENT DOCUMENTS 4,897,439 A 1/1990 Rau et al.
6,001,205 A 12/1999 Mauro
(Continued)

FOREIGN PATENT DOCUMENTS

CN 103153538 A 6/2013
CN 103270327 A 8/2013
(Continued)

*Primary Examiner* — Taiwo Oladapo
(74) *Attorney, Agent, or Firm* — Abel Schillinger, LLP; Ann Palma

(57) ABSTRACT

Embodiments of the present disclosure are directed to an adhesive layer, bearing including the adhesive layer, and methods of forming. The adhesive layer can include a mixture of a first polymer, a second polymer, and a third polymer, wherein the second polymer includes ethylene tetrafluoroethylene, and the third polymer includes a modified ethylene tetrafluoroethylene, ethylene tetrafluoroethylene hexafluoropropylene, or a combination thereof. In a particular embodiment, the first polymer can include an aromatic polymer. In another embodiment, the adhesive layer can have a tensile stress in an extrusion direction of at least 30 MPa.

20 Claims, 6 Drawing Sheets

Mixture A

30μm

30μm

Mixture B

30μm

30μm

Related U.S. Application Data

(60) Provisional application No. 62/650,177, filed on Mar. 29, 2018.

(52) U.S. Cl.
CPC ........... C09J 127/24 (2013.01); F16C 33/201 (2013.01); F16C 33/203 (2013.01); F16C 33/206 (2013.01); F16C 33/208 (2013.01); C08L 2205/02 (2013.01); F16C 2202/06 (2013.01); F16C 2202/20 (2013.01); F16C 2208/30 (2013.01); F16C 2208/58 (2013.01)

(58) Field of Classification Search
CPC .............. F16C 2208/58; F16C 2208/30; F16C 2202/06; F16C 33/206; F16C 33/201; F16C 33/208; C08L 2205/02
See application file for complete search history.

(56) References Cited

U.S. PATENT DOCUMENTS

| | | | |
|---|---|---|---|
| 6,140,410 A | 10/2000 | Kolouch | |
| 8,802,602 B2 | 8/2014 | Schmitjes et al. | |
| 8,840,308 B2 | 9/2014 | Ortiz et al. | |
| 10,253,811 B2 | 4/2019 | Dong et al. | |
| 10,947,427 B2* | 3/2021 | Dong | ............... C09J 129/10 |
| 2005/0069778 A1 | 3/2005 | Bonnet et al. | |
| 2010/0173093 A1 | 7/2010 | Radcliffe et al. | |
| 2012/0128280 A1* | 5/2012 | Ortiz | ..................... B32B 15/18 |
| | | | 384/129 |
| 2012/0275731 A1 | 11/2012 | Ziegler et al. | |
| 2013/0196581 A1 | 8/2013 | Boutaghou et al. | |
| 2014/0010484 A1 | 1/2014 | Schmitjes | |
| 2014/0100144 A1 | 4/2014 | Ziegler et al. | |
| 2015/0132498 A1 | 5/2015 | Hardgrave et al. | |
| 2016/0238072 A1* | 8/2016 | Schmitjes | ............. B05D 7/584 |
| 2017/0089390 A1 | 3/2017 | Dong et al. | |

FOREIGN PATENT DOCUMENTS

| | | |
|---|---|---|
| CN | 103502665 A | 1/2014 |
| CN | 104364079 A | 2/2015 |
| CN | 104641133 A | 5/2015 |
| JP | 2014518989 A | 8/2014 |
| KR | 20130084694 A | 7/2013 |
| WO | 2012149447 A2 | 11/2012 |
| WO | 2014049137 A1 | 4/2014 |
| WO | 2017053880 A1 | 3/2017 |

* cited by examiner

ADHESIVE, BEARING WITH THE ADHESIVE, AND METHODS OF MAKING

CROSS-REFERENCE TO RELATED APPLICATION(S)

This application is a continuation application of and claims priority under 35 U.S.C. § 120 to U.S. patent application Ser. No. 16/370,498, entitled "ADHESIVE, BEARING WITH THE ADHESIVE, AND METHODS OF MAKING," by Jing DONG, Nafih MEKHILEF and Dongyeop SHIN, filed Mar. 29, 2019, which claims priority under 35 U.S.C. § 119(e) to U.S. Patent Application No. 62/650,177 entitled "ADHESIVE, BEARING WITH THE ADHESIVE, AND METHODS OF MAKING," by Jing DONG, Nafih MEKHILEF and Dongyeop SHIN, filed Mar. 29, 2018, all of which are assigned to the current assignee hereof and incorporated herein by reference in their entireties.

FIELD OF THE DISCLOSURE

The present disclosure relates to an adhesive layer, a bearing including the adhesive layer, and methods of making the adhesive layer and bearings with the adhesive layer.

BACKGROUND

Some adhesives can be used in bearing production. For example, adhesive layers may be used to bond a polymer layer and a metal support, which requires sufficient adhesion strength of the adhesives to both materials to avoid failure of bonding. The industry continues to demand improved adhesives for manufacture of bearings.

BRIEF DESCRIPTION OF THE DRAWINGS

Embodiments are illustrated by way of example and are not limited in the accompanying figures.

Figure 1:
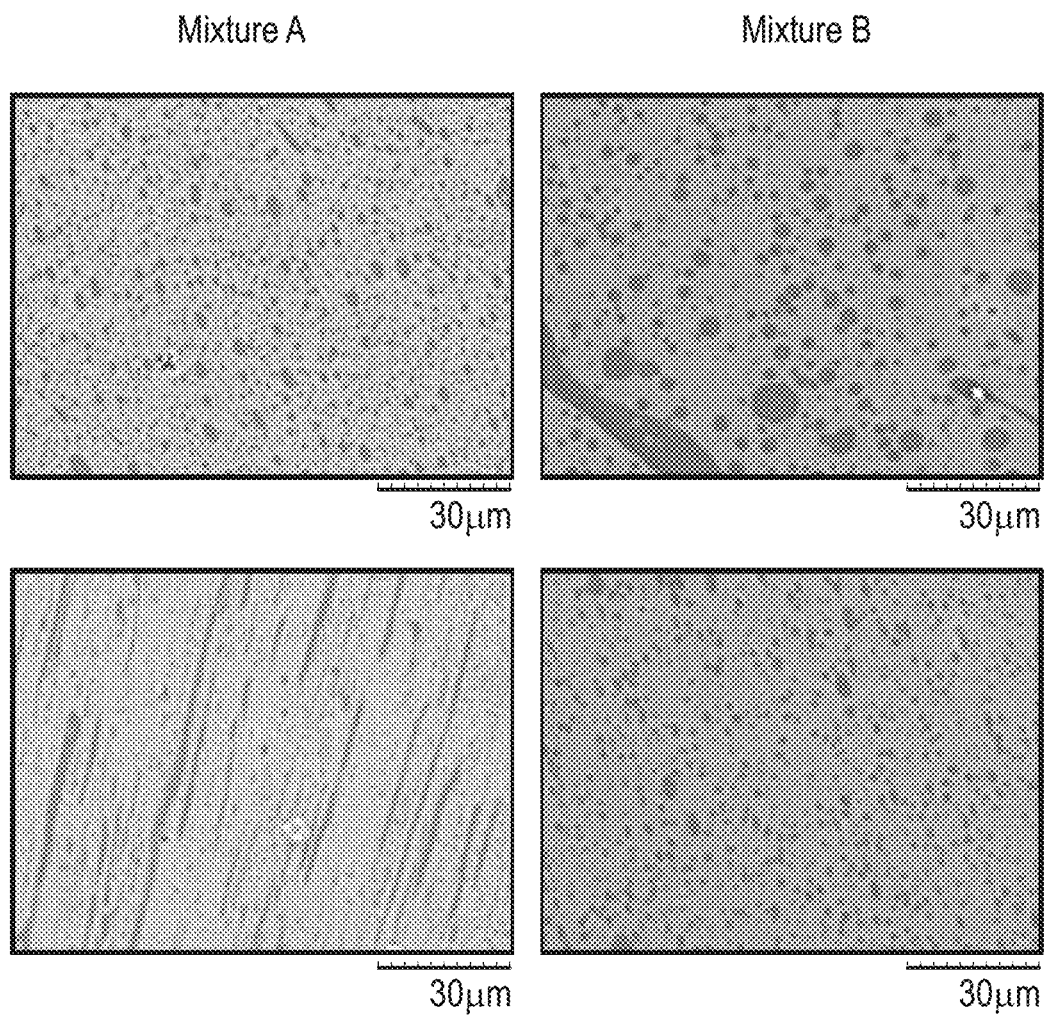
FIG. 1 includes images of a blend according to an embodiment disclosed herein and a conventional blend.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the arts this disclosure belongs to.

Embodiments disclosed herein relate to an adhesive layer. The adhesive layer can include a first polymer, a second polymer, and a third polymer, wherein the second polymer can include a fluoropolymer, such as ethylene tetrafluoroethylene (hereinafter referred to as ETFE), and the third polymer can include a modified fluoropolymer of the second polymer, such as modified ethylene tetrafluoroethylene (hereinafter referred to as mETFE), another fluoropolymer, such as ethylene tetrafluoroethylene hexafluoropropylene (hereinafter referred to as EFEP), or a combination thereof. The adhesive layer can have improved properties, such as mechanical strength, and chemical resistance. For instance, the adhesive layer can have increased peel strength, and/or elongation at break. In another instance, the adhesive layer can have increased melting temperature that can allow the adhesive layer to have improved stability and be suitable for applications that prefer a relatively higher melting temperature. In a further embodiment, the adhesive layer can have improved erosion resistance.

Other embodiments relate to methods of forming an adhesive layer. The methods can include forming a mixture including the first polymer, the second polymer, and the third polymer with. The polymers can be different from one another. In an embodiment, the first polymer and the second polymer can be immiscible. The presence of the third polymer can facilitate formation of the mixture having a uniform dispersion, which can allow conventional processing technologies to be conducted and formation of adhesive layers with the improved properties. In a particular embodiment, the mixture can consist essentially of the first polymer, the second polymer, and the third polymer. In a more particular embodiment, the adhesive layer can consist essentially of the first polymer, the second polymer, and the third polymer.

In an embodiment, the adhesive layer can include a certain content of the first polymer that can facilitate improved formation and/or properties of the adhesive layer. For example, the first polymer can be present in the adhesive layer in a content of at least 1 wt. % for the total weight of the adhesive layer, such as at least 3 wt. %, at least 5 wt. %, at least 7 wt. %, at least 8 wt. %, at least 9 wt. %, or at least 11 wt. % for the total weight of the adhesive layer. In another example, the content of the first polymer may be at most 30 wt. % for the total weight of the adhesive layer, such as at most 28 wt. %, at most 25 wt. %, at most 23 wt. %, or at most 20 wt. %. It is to be appreciated that the first polymer can be present in a content in a range including any of the minimum and maximum percentages disclosed herein. For example, the content of the first polymer can be in a range of 1 wt. % to 30 wt. %, or in a range of 5 wt. % to 25 wt. %, or in a range of 7 wt. % to 23 wt. %.

According to an embodiment, the first polymer can have a melting temperature of at least 170° C., such as at least 190° C. In another embodiment, the first polymer may have a melting temperature at most 350° C., such as at most 315° C., at most 300° C., or at most 280° C. It is to be understood the melting temperature of the first polymer can be in a range including any of the minimum and maximum values disclosed herein. According to another embodiment, the first polymer can have a glass transition temperature of at least 170° C., such as at least 190° C. In another embodiment, the first polymer may have a glass transition temperature at most 315° C., such as at most 300° C. or at most 280° C. It is to be understood the glass transition temperature of the first polymer can be in a range including any of the minimum and maximum values disclosed herein. For example, the glass transition temperature of the first polymer can be in a range of 170 to 315° C., for instance, in a range of 190° C. to 300° C.

According to an embodiment, the first polymer can have a melt flow rate of at least 0.5 g/10 min, at least 1 g/10 min, or at least 3 g/10 min as measured according to ASTM D-1238. In a further embodiment, the first polymer may have a melt flow rate of no greater than 25 g/10 min 20 g/10 min, no greater than 18 g/10 min, or no greater than 15 g/10 min as measured according to ASTM D-1238. It can be appreciated that the first polymer can have a melt flow rate in a range of any of the minimum and maximum values provided herein. For example, the melt flow rate of the first polymer can be in a range including 0.5 g/10 min to 25 g/10 min, in a range including 1 g/10 min to 18 g/10 min, or in a range including 3 to 15 g/10 min as measured according to ASTM D-1238.

According to an embodiment, the first polymer can include a thermoplastic. In another embodiment, the first polymer can include a sulfone group, an ether group, or any combination thereof. In a further embodiment, the first polymer can include an aromatic polymer. An exemplary first polymer can include an aromatic polyester, a polyphenylene ether (hereinafter referred to as PPE), a liquid crystal polymer (hereinafter referred to as LCP), a polyether ether ketone (hereinafter referred to as PEEK), a polyaryletherketones (hereinafter referred to as PAEK), a polyether ketone (hereinafter referred to as PEK), polyimide (hereinafter referred to as PI), a polyamidimide (hereinafter referred to as PAI), thermoplastic polyimide (hereinafter referred to as PI), polyetherimide (hereinafter referred to as PEI), polyethersulfone (hereinafter referred to as PESU), Polyphenylene sulfide (hereinafter referred to as PPS), polyphenylsulfone (hereinafter referred to as PPSU), polyphthalamide (hereinafter referred to as PPA), polycarbonate (hereinafter referred to as PC), aromatic and linear polyamides, or a combination thereof. In another embodiment, the first polymer may be a polymer other than a fluoropolymer. In a particular embodiment, the first polymer can include PESU. In a more particular embodiment, the first polymer can consist essentially of PESU.

According to an embodiment, the adhesive layer can include the second polymer in a certain content that can facilitate improved formation and/or properties of the adhesive layer. For instance, the second polymer can have a content of at least 60 wt. %, relative to the total weight of the adhesive layer, such as at least 63 wt. %, at least 65 wt. %, at least 68 wt. %, at least 70 wt. %, or at least 73 wt. %. In another embodiment, the content of the second polymer may be at most 98 wt. %, at most 95 wt. %, at most 93 wt. %, or at most 90 wt. % relative to the total weight of the adhesive layer. It can be appreciated that the second polymer can have a content in a range including any of the minimum and maximum percentages disclosed herein. For example, the weight content can be in a range of 60 wt. % to 98 wt. %, in a range of 65 wt. % to 95 wt. %, or in a range of 70 wt. % to 90 wt. %.

In an embodiment, the second polymer can have a melting temperature greater than the melting temperature of the first polymer. For example, the second polymer can have a melting temperature of at least 200° C., such as at least 220° C., or at least 240° C. In another embodiment, the second polymer may have a melting temperature at most 340° C., such as at most 315° C., or at most 310° C. at most 290° C. or at most 270° C. It is to be understood the melting temperature of the second polymer can be in a range including any of the minimum and maximum values disclosed herein. For example, the melting temperature of the second polymer can be in a range of 200° C. to 315° C., such as in a range of 240° C. to 290° C.

According to an embodiment, the second polymer can have a melt flow rate of at least 1 g/10 min, at least 1.5 g/10 min, or at least 2 g/10 min as measured according to ASTM D-1238. In a further embodiment, the melt flow rate of the second polymer may be at most 15 g/10 min, at most 10 g/10 min, or at most 7 g/10 min as measured according to ASTM D-1238. It can be appreciated that the second polymer can have a melt flow rate in a range including any of the minimum and maximum values provided herein. For example, the melt flow rate can be in a range of 1 g/10 min to 25 g/10 min, in a range of 1.5 g/10 min to 10 g/10 min, or in a range of 2 to 7 g/10 min as measured according to ASTM D-1238.

According to an embodiment, the second polymer can include including ETFE. In a particular embodiment, the second polymer can consist essentially of ETFE. In another embodiment, the fluoropolymer can include a fluoropolymer different from ETFE, such as a tetrafluoroethylene-hexafluoropropylene (hereinafter referred to as FEP), a tetrafluoro-ethylene-perfluoro (methyl vinyl either) (hereinafter referred to as MFA) and an ethylene chlorotrifluoroethylene copolymer (hereinafter referred to as ECTFE), or any combination thereof. In at least one embodiment, the second polymer can include ETFE and another fluoropolymer noted herein.

According to an embodiment, the adhesive layer can include the third polymer in a certain content that can facilitate improved formation and/or properties of the adhesive layer. In an embodiment, the third polymer may have a lower content than the first polymer, the second polymer, or both. In another embodiment, the third polymer may have a content greater than the first polymer. In a further embodiment, the third polymer can be present in the adhesive layer in a content of at least 1 wt. % for the total weight of the adhesive layer. For instance, the third polymer can have a weight content of at least 2 wt. % or at least 3 wt. % or at least 5 wt. % for the total weight of the adhesive layer. In a further embodiment, the third polymer can be present in a content at most 15 wt. %, such as at most 12 wt. % or at most 10 wt. %. It is to be appreciated that the third polymer can have a content in a range including any of the minimum and maximum percentages disclosed herein. For example, the content of the third polymer can be in a range of 1 wt. % to 15 wt. %, such as in a range of 3 wt. % to 12 wt. % or in a range of 5 wt. % to 10 wt. % for a total weight of the adhesive layer. In another instance, the third polymer can be present in the adhesive layer in a content from 1 wt. % to 10 wt. %, from 2 wt. % to 9 wt. %, or from 3 wt. % to 7 wt. % for a total weight of the adhesive layer. In another embodiment, it may be desired to increase the content of the third polymer in the adhesive layer. For instance, the content can be higher than 15 wt. %. This higher content of the third polymer may facilitate further improved mechanical properties as desired by the application.

In an embodiment, the third polymer can have a melting temperature of at least 170° C., such as at least 180° C. or at least 190° C. or at least 220° C. In another embodiment, the third polymer may have a melting temperature at most 310° C., such as at most 300° C. or at most 290° C. It is to be understood the melting temperature of the third polymer can be in a range including any of the minimum and maximum values disclosed herein. For example, the melting temperature of the third polymer can be in a range of 170 to 310° C., such as in a range of 180° C. to 290° C.

According to an embodiment, the third polymer can have a melt flow rate of at least about 3 g/10 min, at least about 5 g/10 min, or at least about 8 g/10 min as measured according to ASTM D-1238. Ina further embodiment, the melt flow rate of the third polymer may be at most about 25 g/10 min, no greater than about 22 g/10 min, or no greater than about 20 g/10 min as measured according to ASTM D-1238. It can be appreciated that the melt flow rate can be in a range of any of the minimum and maximum values provided herein. For example, the melt flow rate can be in a range of 3 g/10 min to 25 g/10 min, in a range of 5 g/10 min to 22 g/10 min, or in a range of 8 to 20 g/10 min as measured according to ASTM D-1238.

According to an embodiment, the third polymer can include a modified fluoropolymer of the second polymer, such as a mETFE, another fluoropolymer, such as an EFEP, or a combination thereof. As used herein, modification of a fluoropolymer can include incorporating a functional group into the fluoropolymer. The modified fluoropolymer may demonstrate improved properties as compared to the unmodified version of the fluoropolymer. For instance, a functional group can be added to change adhesive strength, melt flow rate, processability, and other properties of the unmodified fluoropolymer. The fluoropolymer may be modified by techniques known in the art. For example, irradiation or chemical modification.

In an embodiment, the functional group can include a hydroxyl group (—OH), a carbonyl fluoride (—COF), a carboxyl group (—COOH), a maleic anhydride group (—(CHCO)$_2$O), an acrylate group (—CH$_2$=CHCOOH), a glycidyl methacrylate group (—CH$_2$C(CH$_3$) COOCH$_2$ (CHCH$_2$)), or a combination thereof. In another embodiment, the modified fluoropolymer can include the fluoropolymer of the second polymer modified with any one or more of the functional groups disclosed herein. For instance, the modification to ETFE can include addition of a functional group including —(CHCO)$_2$O. In another instance, the modified fluoropolymer can include modified PFA, modified FEP, modified MFA, modified ECTFE, or any combination thereof.

In a particular embodiment, the third polymer can include mETFE, EFEP, or a combination thereof. In a more particular embodiment, the third polymer can consist essentially of EFEP. In another more particular embodiment, the third polymer can consist essentially of mETFE.

In a further embodiment, the adhesive layer can include ETFE, PESU, and mETFE or EFEP. In a particular embodiment, the adhesive layer can consist essentially of ETFE, PESU, and mETFE. In another particular embodiment, the adhesive layer can consist essentially of ETFE, PESU, and EFEP.

According to an embodiment, the adhesive layer can have a ratio (W$_2$:W$_3$) of the weight content of the second polymer (W$_2$) to the weight content of the third polymer (W$_3$) that can facilitate improved formation and/or properties of the adhesive layer. In an embodiment, the weight ratio W$_2$:W$_3$ may be at least 10:1. For instance, the weight ratio W$_2$:W$_3$ can be at least 12:1, at least 13:1, or at least 14:1, or at least 15:1. In another embodiment, the weight ratio W$_2$:W$_3$ may be at most 110:1, such as at most 95:1, at most 85:1, at most 65:1, at most 45:1, or at most 30:1. It can be appreciated that the weight ratio W$_2$:W$_3$ can be in a range including any of the minimum and maximum ratios disclosed herein. For example, the weight ratio can be in a range of 10:1 to 99:1, in a range of 12:1 to 85:1, or in a range of 14:1 to 45:1.

According to an embodiment, the adhesive layer can have a weight ratio (W$_2$:W$_1$) of the weight content of the second polymer (W$_2$) to the weight content of the first polymer (W$_1$) that can facilitate improved formation and/or properties of the adhesive layer. According to an embodiment, the weight ratio W$_2$:W$_1$ can be at least 2:1, at least 2.5:1, at least 3:1, at least 4:1, at least 6:1, at least 8:1, or at least 9:1. In another embodiment, the weight ratio W$_2$:W$_1$ may be at most 40:1, at most 30:1, at most 24:1, at most 20:1, at most 18:1, at most 14:1, at most 12:1, at most 11:1, or at most 10:1. It can be appreciated that the weight ratio W$_2$:W$_1$ can be in a range including any of the minimum and maximum ratios disclosed herein. For example, the weight ratio can be in a range of 2:1 to 40:1, in a range of 3:1 to 20:1, in a range of 4:1 to 12:1, or in a range of 8:1 to 11:1.

According to an embodiment, the adhesive layer can have a certain ratio W$_1$:W$_3$ of the weight content of the first polymer (W$_1$) to the weight content of the third polymer (W$_3$) that can facilitate improved formation and properties of the adhesive layer. According to an embodiment, the weight ratio W$_1$:W$_3$ can be at least 1:1, at least 2:1, or at least 3:1. In another embodiment, the weight ratio W$_1$:W$_3$ may be at most 50:1, at most 34:1, at most 20:1, or at most 10:1. It can be appreciated that the weight ratio W$_1$:W$_3$ can be in a range including any of the minimum and maximum ratios disclosed herein. For example, the weight ratio can be in a range of 1:1 to 55:1, in a range of 2:1 to 34:1, or in a range of 3:1 to 20:1.

The first, second, and third polymers can be mixed to have the weight content, weight ratio, or both as disclosed herein.

For example, the weight content of the third polymer may be at most that of the first polymer, the second polymer, or both. In a further embodiment, the weight content or weight ratio of the polymers can be selected to form the adhesive layer with desired properties. In a particular embodiment, the weight content of the third polymer can be selected to facilitate formation of the adhesive layer with desired properties.

In an embodiment, the third polymer can serve as a compatibilizer for the first polymer and the second polymer such that the mixture including the first, second, and third polymers can form a uniform dispersion. In an embodiment, the mixture can include a continuous phase of the second polymer with the first polymer evenly dispersed within the continuous phase. In a further embodiment, at least 90% of the first polymer within the second polymer phase may have a domain size of at most 20 microns, such as at most 18 microns, or at most 15 microns. In another embodiment, at least 90% of the first polymer within the second polymer phase can have a domain size of at least 1 micron, such as at least 3 microns or at least 5 microns. It is to be appreciated that at least 90% of the first polymer inside the second polymer can have a domain size in a range including any of the minimum and maximum values disclosed herein, such as in a range of 1 micron to 20 microns or in a range of 5 microns to 18 microns. In another embodiment, at least 95% or at least 98% of the first polymer within the continuous phase can have the domain size disclosed herein. Such domain size can help to maintain the morphological stability of the compound resulted from the mixture disclosed herein and prevent coalescence of domains of the first polymer, thus improving the mechanical strength of the adhesive layer formed therefrom.

In another embodiment, the third polymer can improve the processability of the mixture. For instance, a mixture of the first polymer (e.g. PESU) and the second polymer (e.g. ETFE) may not be continuously compounded, for example, by a twin-screw compounder, due to the incompatibility of the polymers. Adding the third polymer (e.g. mETFE or EFEP) can improve the compatibility of the polymers and allow continuous processing of the mixture under the same compounding condition.

Accordingly, in an embodiment, forming the adhesive layer can include blending the first, second, and third polymers to form a uniform dispersion. In another embodiment, the mixture of the first, second, and third polymers can have two melting temperatures, and both are between the melting temperature of the first polymer and that of the second polymer. Having such melting temperatures can be an indication of improved compatibility between the first polymer and the second polymer in the mixture, which may result in improved properties of the compound resulted from the mixture. In the absence of the third polymer, the mixture of the first and second polymers can have two melting temperatures that are exactly the melting temperatures of the first and second polymers due to immiscibility of the first and second polymers. In a further embodiment, the mixture can be compounded and extruded, for instance by using a screw driven extruder, to form the adhesive layer.

According to an embodiment, the adhesive layer can be formed to have a particular peel strength. As disclosed herein, peel strength is measured by a 180° T-peel test according to ASTM D1876-01 and tested on a five-layer laminate structure. The laminate structure includes in the order from bottom to top, a first zinc plated steel backing, a first layer of the adhesive layer, a sliding layer, a second layer of the adhesive layer, and a second zinc plated steel backing. Strips of the specimens of each layer having a width of 25 mm are placed on top of one another as disclosed herein and pressed using a lab scale press for 5 min at 315° C. In the T-peel test, the zinc plated steel backings are pulled apart using clamps and the peel force needed for detaching the zinc plated steel backings is measured using an Instron mechanical testing system (e.g., 3369 Dual Column Universal testing system). Sliding layers having different compositions can be used to perform the test.

In an embodiment, the adhesive layer can have a peel strength of at least 110 N/in, such as at least 115 N/in, at least 120 N/in, or at least 125 N/in. In another embodiment, peel strength may be at most 250 N/in, such as at most 220 N/in, at most 200 N/in, at most 190 N/in, at most 170 N/in, or 150 N/in. It is to be understood that peel strength of the adhesive layer may be in a range including any of the minimum and maximum values disclosed herein. For instance, the adhesive layer can have peel strength in a range of 110 N/in to 250 N/in, in a range of 115 N/in to 190 N/in, or in a range of 120 N/in to 150 N/in. Peel strength as disclosed herein is to be understood as an average of the measurements of at least 3 five-layer laminate structures.

In an embodiment, the peel strength may be changed by adjusting thickness of the adhesive layer. For instance, increasing the thickness of the adhesive layer can increase the peel strength. In some applications, a thicker adhesive layer may be desired to provide a stronger bonding. In an embodiment, the thickness of the adhesive layer can be at least 15 microns, such as at least 18 microns, at least 20 microns, at least 22 microns, at least 25 microns, or at least 30 microns. In another embodiment, the thickness can be at most 56 microns, at most 48 microns, at most 43 microns, or at most 40 microns. It is to be understood that the thickness of the adhesive layer can be in a range including any of the minimum and maximum values disclosed herein. For example, the thickness of the adhesive layer can be in a range of 15 microns to 56 microns, in a range of 20 microns to 48 microns, or in a range of 25 microns to 43 microns.

In a further embodiment, the adhesive layer can have a normalized peel strength. The normalized peel strength may be determined by normalizing the peel strength relative to the thickness of the adhesive layer. In another embodiment, normalized peel strength of the adhesive layer may be changed by adjusting the weight content of the third polymer. For a mixture of the first polymer and the second polymer, normalized peel strength of the resulted adhesive layer may be less than 2.5 N/in/microns. However, adding the third polymer to the mixture can improve the normalized peel strength. For example, the adhesive layer noted in embodiments of this disclosure can have a normalized peel strength of at least 2.7 N/in/microns, such as at least 3.0 N/in/microns, at least 3.2 N/in/microns, at least 3.5 N/in/microns, or at least 4.0 N/in/microns. In another instance, the normalized peel strength of the adhesive layer may not be greater than 20.0 N/in/microns, such as at most 12.0 N/in/microns, at most 10.0 N/in/microns, at most 8 N/in/microns, at most 7.3 N/in/microns, than 7.1 N/in/microns, at most 6.5 N/in/microns, or at most 6.0 N/in/microns. It is to be appreciated that normalized peel strength can be in a range including any of the minimum and maximum values disclosed herein. For example, the normalized peel strength can be in a range of 2.7 N/in/microns to 20 N/in/microns, in a range of 3.0 N/in/microns to 12 N/in/microns, in a range of 3.2 N/in/microns to 7.3 N/in/microns. In another embodiment, increasing the weight content of the third polymer can further increase normalized peel strength.

According to an embodiment, the adhesive layer can have an elongation at break along a longitudinal direction and an elongation at break along a transverse direction. As disclosed herein, the longitudinal direction can be the extrusion direction, and the transversal direction can be perpendicular to the longitudinal direction. The elongation at break along the longitudinal direction is calculated by formula $(L_{break}-L_o)/L_o \times 100\%$, where $L_{break}$ is the length at break of the adhesive layer, and $L_o$ is the original length of the adhesive layer before being stretched along the longitudinal direction. The elongation at break along the transverse direction is calculated by formula $(W_{break}-W_o)/W_o \times 100\%$, where $W_{break}$ is the width at break of the adhesive layer, and $W_o$ is the original width of the adhesive layer before being stretched along the transverse direction. The elongations at break along the two directions may be different or similar. In a particular embodiment, the elongation at break along the longitudinal direction may not be less than that along the transverse direction. As used herein, the elongation at break is measured in accordance with ASTM-D638. The elongation at break is to be understood as an average of the measurements of at least 3 samples.

In an embodiment, the adhesive layer can be formed to have a desirable elongation at break along the longitudinal direction, transversal direction, or both. In another embodiment, the elongation at break of the adhesive layer can be changed by adjusting the content of the third polymer. Particularly, including the third polymer to the mixture of the first polymer and the second polymer can improve elongation at break along the transverse direction of the mixture. In the absence of the third polymer, the elongation at break of mixture layer formed of the first and second polymers may not be greater than 10% in the transversal direction. However, including the third polymer at the weight content disclosed herein can allow the adhesive layer to have the elongation at break in the transversal direction higher than 10%.

In an embodiment, the elongation at break along the transverse direction of the adhesive layer can be at least 35%, such as at least 65%, at least 70%, at least 100%, at least 130%, or at least 200%. In a further embodiment, the elongation at break along the transverse direction can be at most 350%, at most 300%, or at most 290%. It is to be understood that the elongation at break in the transverse direction can be in a range including any of the minimum and maximum percentages disclosed herein. For example, the elongation at break along the transverse direction can be in a range of 35% to 350%.

In another embodiment, the elongation in the extrusion direction can be at least 85%, such as at least 95%, at least 105%, at least 150%, at least 180%, at least 200%, or at least 220%. In another embodiment, the elongation at break along the longitudinal direction may at most 400%, at most 370%, at most 350%, or at most 330%. In this disclosure, the longitudinal direction and the extrusion direction are used interchangeably. It is to be understood that the elongation at break along the longitudinal direction can be in a range including any of the minimum and maximum percentages disclosed herein. For example, the elongation at break along the longitudinal direction can be in a range of 85% to 400%, in a range of 180% to 350%, or in a range of 220% to 330%.

In a further embodiment, the adhesive layer can have a ratio of the elongation at break along the longitudinal direction to the elongation at break along the transverse direction. For instance, the ratio can be at least 0.8:1, at least 1.0:1, such as at least 1.2:1, or at least 1.5:1. In another instance, the ratio may be at most 15.0:1, or at most 11.0:1, at most 7.0:1, at most 5.5:1, or at most 4.5:1. It is to be understood that the ratio of the elongation at break along the longitudinal direction to the elongation at break along the transverse direction can be in a range including any of the minimum and maximum ratios disclosed herein. For example, the ratio can be in a range of 0.8:1 to 15.0:1, in a range of 1.0:1 to 7.0:1.

According to an embodiment, the adhesive layer can have a tensile stress in the extrusion direction and the transversal direction. The tensile stress is measured in accordance with ASTM-D638. The tensile stress noted in this disclosure is to be understood as an average of the measurements of at least 3 samples. In an embodiment, the adhesive layer can have a tensile stress in the extrusion direction of at least 29 MPa, such as at least 30 MPa, at least 33 MPa, at least 35 MPa, or at least 38 MPa. In another embodiment, tensile stress in the extrusion direction can be at most 65 MPa, such as at most 60 MPa, at most 55 MPa, at most 50 MPa, at most 45 MPa, or at most 40 MPa. Moreover, the tensile stress in the extrusion direction can be within a range including any of the minimum and maximum values noted herein. For instance, the tensile stress in the extrusion direction can be in the range from 29 MPa to 65 MPa or in the range from 30 MPa to 50 MPa.

In an embodiment, the adhesive layer can have a tensile stress in the transversal direction of at least 20 MPa, such as at least 22 MPa, or at least 25 MPa. In another embodiment, tensile stress in the transversal direction can be at most 45 MPa, such as at most 42 MPa, at most 38 MPa, or at most 35 MPa. Moreover, the tensile stress in the transversal direction can be within a range including any of the minimum and maximum values noted herein. For instance, the tensile stress in the extrusion direction can be in the range from 20 MPa to 45 MPa or in the range from 22 MPa to 42 MPa.

In an embodiment, the adhesive layer can be formed to have a particular complex viscosity. For instance, complex viscosity can be tuned to be suitable for a lamination process such that oozing problems may be prevented. In a further embodiment, the first polymer, the second polymer, or both can be selected to have a particular melt flow rate for obtaining a desirable complex viscosity. In another embodiment, adjusting the weight content of at least one of the first polymer, the second polymer, and the third polymer can facilitate formation of the adhesive layers having a desired complex viscosity.

The complex viscosity of the adhesive layer is measured using an ARES rotational rheometer (TA Instruments) with a 25 mm parallel plate fixture. Temperature ramp is performed from 280° C. to 310° C. at 1 Hz and at a strain rate of 25%.

In an embodiment, the adhesive layer can have a complex viscosity of at least $8.5 \times 10^3$ Pa·s as measured at 300° C. and 1 rad/s. For instance, the complex viscosity can be at least $1.0 \times 10^3$ Pa·s, at least $1.5 \times 10^3$ Pa·s, at least $2.5 \times 10^3$ Pa·s, at least $3.0 \times 10^3$ Pa·s, at least $4.2 \times 10^3$ Pa·s, at least $4.6 \times 10^3$ Pa·s, at least $5.0 \times 10^3$ Pa·s, as measured at 300° C. and 1 rad/s. In another instance, the complex viscosity may not be greater than $19.8 \times 10^3$ Pa·s as measured at 300° C. and 1 rad/s, such as at most $19.3 \times 10^3$ Pa·s, at most $18.8 \times 10^3$ Pa·s, at most $18.2 \times 10^3$ Pa·s, at most $17.8 \times 10^3$ Pa·s, or at most $17.5 \times 10^3$ Pa·s as measured at 300° C. and 1 rad/s. It is to be understood that the complex viscosity of the adhesive layer can be in a range including any of the minimum and maximum values disclosed herein. For example, the complex viscosity of the adhesive layer can be in a range of $3.5 \times 10^3$ Pa·s to $19.8 \times 10^3$ Pa·s, such as in a range of $9.2 \times 10^3$ Pa·s to 18.2×10³ Pa·s or in a range of 10.2×10³ Pa·s to 17.8×10³ Pa·s as measured at 300° C. and 1 rad/s.

According to an embodiment, the adhesive layer can have a certain melting temperature that can facilitate improved formation and/or properties of the adhesive layer. For example, the melting temperature of the adhesive layer can be at most 315° C., at most 300° C., or at most 280° C. In another embodiment, the melting temperature of the adhesive layer can be at least 250° C., such as at least 280° C. or at least 300° C. The melting temperature of the adhesive layer can be in a range including any of the minimum and maximum values disclosed herein. In another embodiment, the melting temperature can be adjusted by changing the contents of the polymers to suit different applications.

According to an embodiment, the melting temperature of the adhesive layer can be higher than that of the third polymer, such as at least 20° C. higher, at least 22° C., or at least 25° C. higher. In an embodiment, the difference can be at most 100° C. For example, the melting temperature of the adhesive layer can be at most 90° C. higher than that of the third polymer, such as at most 80° C. higher, or at most 60° C. higher. It is to be understood that the difference between the melting temperatures of the adhesive and the third polymer can be in a range including any of the minimum and maximum values noted herein.

In an embodiment, the adhesive layer can be used in a bearing. In an application of such, the bearing can include a substrate layer, and the adhesive layer can be disposed over the substrate layer. In another application, the bearing can also include a sliding layer disposed over the adhesive layer. In a particular application, the adhesive layer can be suitable for a Norglide® bearing.

In a particular embodiment, the adhesive layer can comprise a hot melt adhesive. At a temperature in a range of 250° C. to 400° C., such as in a range of 270° C. to 330° C. or in a range of 280° C. to 315° C., the adhesive layer can melt and form a bonding layer between the substrate layer and the sliding layer. In another application, the adhesive layer can be in direct contact with the substrate layer, the sliding layer, or both.

In an embodiment, the substrate layer can include metal. In another embodiment, the substrate layer can include an alloy. An exemplary metal can include iron, carbon, Ni, Zn, Co, Cr, Ti, Zr, Mo or any combination thereof. In a particular embodiment, the substrate layer can include aluminum, steel, stainless steel, cold-rolled steel, matt zinc plated steel, or any combination thereof. In a particular embodiment, the substrate can include zinc plated steel. In a more particular embodiment, the substrate can include zinc plated steel. In some applications, the adhesive layer noted herein, can be particularly suitable for a substrate of zinc plated steel. In an even more particular embodiment, the bearing can include a substrate of zinc plated steel, and the adhesive layer including the first polymer of ETFE, the second polymer of PESU, and the third polymer including mETFE or EFEP.

In an embodiment, the sliding layer can include a polymer, such as polytetrafluoroethylene, polyether ether ketone, polyetherketone, polyimide, polyamidimide, or any combination thereof. In another embodiment, the sliding layer can include a filler, an additive, an inorganic material, or a combination thereof. For instance, the sliding layer can include carbon, graphite, graphene, CNT, polyesters, glass fiber, carbon fiber, boron nitride, an inorganic filler, or any combination thereof.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. A bearing, comprising:
a substrate layer; and
an adhesive layer disposed over the substrate,
wherein the adhesive layer comprises:
  a first polymer;
  a second polymer comprising an ETFE; and
  a third polymer comprising a mETFE, an EFEP, or a combination thereof; and
wherein the adhesive layer has a characteristic selected from the group consisting of:
  a melting temperature that is at least 20° C. higher than a melting temperature of the third polymer;
  a tensile stress in an extrusion direction of at least 30 MPa;
  a tensile stress in a transversal direction of at least 20 MPa; and
  a melting temperature that is at most 330° C.

Embodiment 2. An adhesive layer, comprising a mixture comprising:
a first polymer;
a second polymer comprising an ETFE; and
a third polymer comprising an mETFE, an EFEP, or a combination thereof,
wherein:
  the first polymer has a first content of at most 25 wt. % relative to a total weight of the adhesive layer;
  the second polymer has a second content of at least 60 wt. % of the total weight; and
  the third polymer has a third content of at most the first content.

Embodiment 3. A bearing, comprising:
a substrate layer;
an adhesive layer disposed over the substrate; and
a sliding layer disposed over the adhesive layer,
wherein the adhesive layer comprises a:
  a first polymer;
  a second polymer comprising an ETFE; and
  a third polymer comprising a mETFE, an EFEP, or a combination thereof, and
  wherein the adhesive layer has:
  a ratio of a first elongation at break along a longitudinal direction to a second elongation at break along a transverse direction is at least 0.8:1 and at most 15:1;
  a normalized peel strength of at least 3.0 N/in/microns; or
  a combination thereof.

Embodiment 4. A method of forming an adhesive layer, comprising:
adding a third polymer to a first polymer and a second polymer to form a mixture including a uniform dispersion of the first polymer, the second polymer, and the third polymer, wherein:
  the second polymer comprises an ETFE;
  the third polymer comprises a mETFE, an EFEP, or a combination thereof;
  90% of the first polymer inside the second polymer has a domain size at most 20 microns;
  the first polymer has a first melting temperature;
  the second polymer has a second melting temperature; and
  the third polymer a third melting temperature and the mixture has a fourth melting temperature that is at least 20° C. higher than the third melting temperature; and extruding the mixture to form the adhesive layer.

Embodiment 5. The method of Embodiment 4, wherein:

the first polymer is immiscible with the second polymer; and the mixture including the first, second, and third polymers is capable of being compounded with a twin-screw compounder.

Embodiment 6. The bearing of Embodiment 1, wherein the mETFE is present in the adhesive layer in a content of at most 10 wt. %, at most 9 wt. %, or at most 7 wt. % relative to a total weight of the adhesive layer.

Embodiment 7. The bearing of Embodiment 1 or 4, wherein the mETFE is present in the adhesive layer in a content of at least 1 wt. %, at least 2 wt. %, or at least 3 wt. % relative to a total weight of the adhesive layer.

Embodiment 8. The adhesive, the bearing, or the method of any one of the preceding Embodiments, wherein mETFE is present in the adhesive layer in a content from 1 wt. % to 10 wt. %, from 2 wt. % to 9 wt. %, or from 3 wt. % to 7 wt. %.

Embodiment 9. The adhesive, the bearing, or the method of any one of the preceding Embodiments, wherein the EFEP is present in the adhesive layer in a content of at most 10 wt. %, at most 9 wt. %, or at most 7 wt. % relative to a total weight of the adhesive layer.

Embodiment 10. The adhesive, the bearing, or the method of any one of the preceding Embodiments, wherein the EFEP is present in the adhesive layer in a content of at least 1 wt. %, at least 2 wt. %, or at least 3 wt. % relative to a total weight of the adhesive layer.

Embodiment 11. The adhesive, the bearing, or the method of any one of the preceding Embodiments, wherein the EFEP is present in the adhesive layer in a content from 1 wt. % to 10 wt. %, from 2 wt. % to 9 wt. %, or from 3 wt. % to 7 wt. % relative to a total weight of the adhesive layer.

Embodiment 12. The adhesive, the bearing, or the method of any one of the preceding Embodiments, wherein the adhesive layer comprises a weight ratio of a content of the ETFE to a content of the first polymer from 8:1 to 12:1.

Embodiment 13. The adhesive, the bearing, or the method of any one of the preceding Embodiments, wherein the first polymer is present in the adhesive layer in a content of at least 3 wt. %, at least 5 wt. %, at least 7 wt. %, or at least 9 wt. % for the total weight of the adhesive layer.

Embodiment 14. The adhesive, the bearing, or the method of any one of the preceding Embodiments, wherein the first polymer is present in the adhesive layer in a content of at most 25 wt. %, at most 20 wt. % or at most 15 wt. % for the total weight of the adhesive layer.

Embodiment 15. The adhesive, the bearing, or the method of any one of the preceding Embodiments, wherein the first polymer is present in the adhesive layer in a content from 3 wt. % to 25 wt. % or from 5 wt. % to 20 wt. % for the total weight of the adhesive layer.

Embodiment 16. The adhesive, the bearing, or the method of any one of the preceding Embodiments, wherein the ETFE is present in the adhesive layer in a content of at least 60 wt. %, or at least 65 wt. %, or at least 70 wt. % for the total weight of the adhesive layer.

Embodiment 17. The adhesive, the bearing, or the method of any one of the preceding Embodiments, wherein the ETFE is present in the adhesive layer in a content of at most 98 wt. %, at most 95 wt. %, or at most 90 wt. % for the total weight of the adhesive layer.

Embodiment 18. The adhesive, the bearing, or the method of any one of the preceding Embodiments, wherein the ETFE is present in the adhesive layer in a content from 60 wt. % to 98 wt. %, from 65 wt. % to 95 wt. %, or from 70 wt. % to 90 wt. % for the total weight of the adhesive layer.

Embodiment 19. The adhesive, the bearing, or the method of any one of the preceding Embodiments, wherein the mETFE comprises a functional group comprising a hydroxyl group (—OH), a carbonyl fluoride (—COF), a carboxyl group (—COOH), a maleic anhydride group (—(CHCO)$_2$O), an acrylate group (—CH$_2$=CHCOOH), a glycidyl methacrylate group (—CH$_2$C(CH$_3$) COOCH$_2$(CHCH$_2$)), or a combination thereof.

Embodiment 20. The adhesive, the bearing, or the method of any one of the preceding Embodiments, wherein the first polymer comprises a thermoplastic.

Embodiment 21. The adhesive, the bearing, or the method of any one of the preceding Embodiments, wherein the first polymer comprises an aromatic polymer.

Embodiment 22. The adhesive, the bearing, or the method of any one of the preceding Embodiments, wherein the first polymer comprises a sulfone group, an ether group, or a combination thereof.

Embodiment 23. The adhesive, the bearing, or the method of any one of the preceding Embodiments, wherein the first polymer comprises a polysulfone.

Embodiment 24. The adhesive, the bearing, or the method of any one of the preceding Embodiments, wherein the first polymer comprises polyethersulfone, polyphenylene sulfide, polyphenylsulfone, or a combination thereof.

Embodiment 25. The adhesive, the bearing, or the method of any one of the preceding Embodiments, wherein the first polymer comprises polyethersulfone.

Embodiment 26. The adhesive, the bearing, or the method of any one of the preceding Embodiments, wherein the first polymer consist essentially of polyethersulfone.

Embodiment 27. The adhesive, the method, or the bearing of any one of the preceding Embodiments, wherein the second polymer consists essentially of the ETFE.

Embodiment 28. The adhesive, the bearing, or the method of any one of the preceding Embodiments, wherein the third polymer consist essentially of mETFE.

Embodiment 29. The adhesive, the method, or the bearing of any one of the preceding Embodiments, wherein the third polymer consists essentially of the modified ETFE.

Embodiment 30. The adhesive, the method, or the bearing of any one of the preceding Embodiments, wherein the third polymer consists essentially of the EFEP.

Embodiment 31. The adhesive, the method, or the bearing of any one of the preceding Embodiments, wherein the adhesive layer consist essentially of PESU, ETFE, and mETFE.

Embodiment 32. The adhesive, the method, or the bearing of any one of the preceding Embodiments, wherein the adhesive layer consist essentially of PESU, ETFE, and EFEP.

Embodiment 33. The adhesive, the method, or the bearing of any one of the preceding Embodiments, wherein the adhesive layer has the melting temperature that is at least 20° C., at least 22° C., or at least 25° C. higher than the melting temperature of the third polymer.

Embodiment 34. The adhesive, the method, or the bearing of any one of the preceding Embodiments, wherein the adhesive layer has a tensile stress in the extrusion direction of at least 30 MPa, at least 33 MPa, at least 35 MPa, or at least 38 MPa, and at most 65 MPa.

Embodiment 35. The adhesive, the method, or the bearing of any one of the preceding Embodiments, wherein the adhesive layer has a tensile stress in the transversal direction of at least 20 MPa, at least 22 MPa, or at least 25 MPa, and at most 40 MPa.

Embodiment 36. The adhesive, the method, or the bearing of any one of the preceding Embodiments, wherein the tensile stress in the transversal direction is at most the tensile stress in the extrusion direction.

Embodiment 37. The adhesive, the method, or the bearing of any one of the preceding Embodiments, wherein the melting temperature of the adhesive layer is at most 330° C., at most 315° C., or at most 300° C.

Embodiment 38. The adhesive, the method, or the bearing of any one of the preceding Embodiments, wherein the substrate layer comprises aluminum, steel, stainless steel, cold-rolled steel, zinc plated steel, or any combination thereof.

Embodiment 39. The adhesive, the method, or the bearing of any one of the preceding Embodiments, wherein the substrate layer comprises zinc plated steel.

Embodiment 40. A method of forming a bearing, comprising:
disposing the adhesive layer of any one of the preceding Embodiments over a substrate; and
disposing a sliding layer over the adhesive layer.

Embodiment 41. The bearing or the method of any one of the preceding Embodiments, wherein the substrate comprises a metal, an alloy, or a combination thereof.

Embodiment 42. The bearing or the method of any one of the preceding Embodiments, wherein the substrate comprises aluminum, steel, stainless steel, cold-rolled steel, matt zinc plated steel, or any combination thereof.

Embodiment 43. The bearing or the method of any one of the preceding Embodiments, wherein the sliding layer comprises polytetrafluoroethylene, polyether ether ketone, polyetherketone, polyimide, polyamidimide, and any combination thereof.

Embodiment 44. The bearing or the method of any one of the preceding Embodiments, wherein the sliding layer comprises a filler, an additive, an inorganic material, or a combination thereof.

EXAMPLES

Example 1

Two mixtures were prepared and tested. Mixture A includes 80 wt. % PFA and 20 wt. % PEEK. Mixture B includes 77.6 wt. % PFA, 19.4 wt. % PEEK, and 3 wt. % modified PFA that was obtained by attaching maleic anhydride groups to PFA through synthesis. A twin-screw compounder was used to blend the polymers to form the mixtures. FIG. 1 includes scanning electronic microscopic images of mixture A and mixture B. The images show the mixtures in the transversal (top panel) and extrusion (bottom) directions. As shown in both images, PEEK (the darker locations) is dispersed in a matrix of PFA (lighter locations). There is no significant difference of dispersion of PEEK in Mixture A and B in the transversal direction. In the extrusion direction, domains of PEEK coalesced to form strings in Mixture A, which resulted in domain sizes varying from a few microns to hundreds of microns. However, in the extrusion direction, PEEK in Mixture B maintains the morphology observed in the transversal direction.

Example 2

Adhesive layer samples were prepared based on the compositions included in Table 1 below. Samples C and D were formed using a twin-screw compounder at 380° C. and then cut into small pellets. The resulted pellets of samples C and D, sample A, and sample B were extruded into films of 30 μm thick using a single screw extruder. At least 5 tensile testing samples were cut from the extruded film from each composition in both extrusion direction and transversal direction. Elongations at break and tensile stress at break in the transversal and extrusion directions were tested the samples.

TABLE 1

| Adhesive Layer Samples | Composition |
| --- | --- |
| A | 100 wt. % PFA |
| B | 100 wt. % modified PFA |
| C | 82.5 wt. % PFA, 14.5 wt. % PEEK, and 3 wt. % modified PFA |
| D | 85 wt. % PFA and 15 wt. % PEEK |

Figure 2:
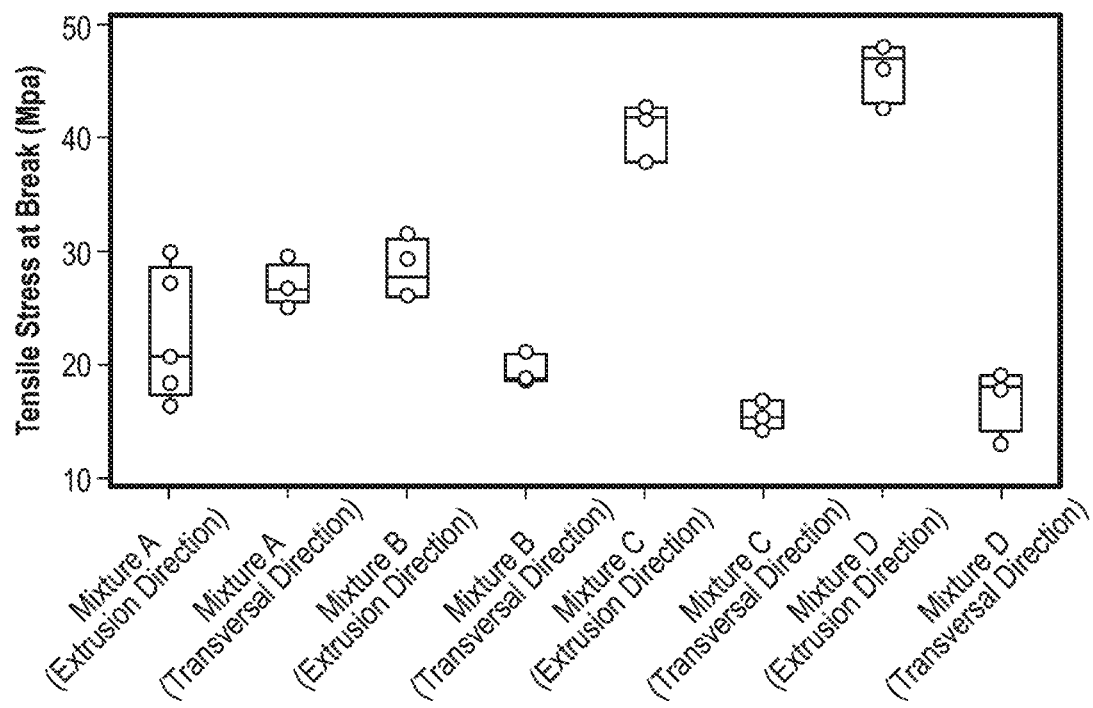
FIG. 2 includes a graph of tensile stress at break of adhesive layers according to embodiments herein and conventional adhesive layers.
Figure 3:
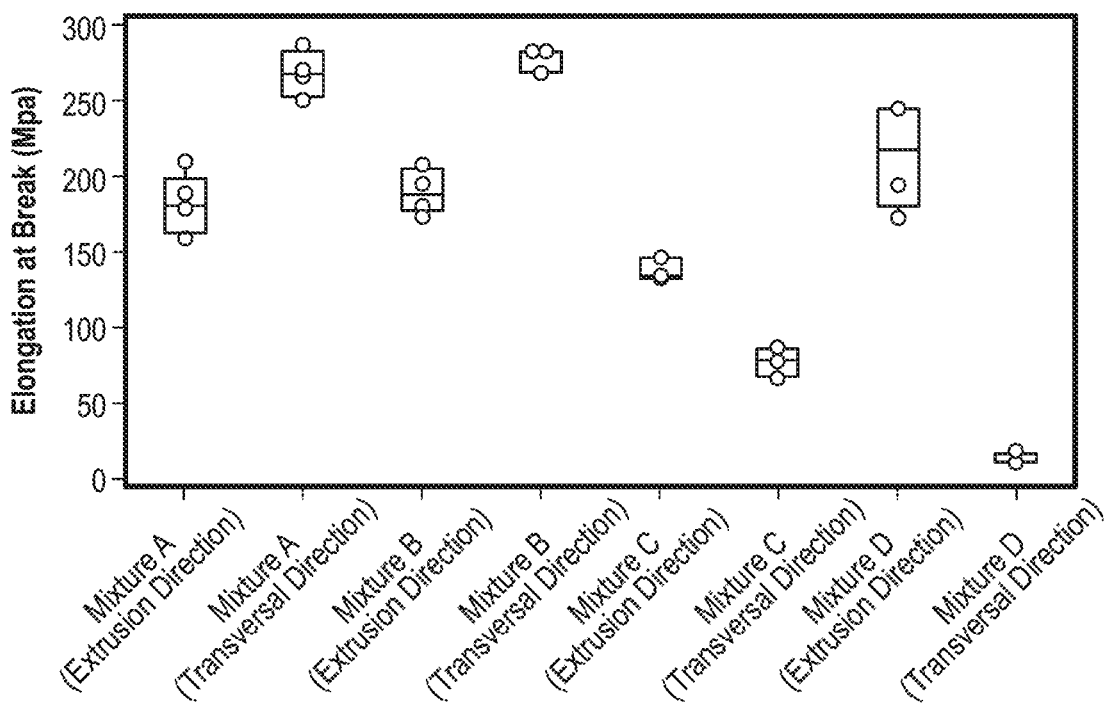
FIG. 3 includes a graph of elongations at break of adhesive layers according to embodiments herein and conventional adhesive layers.

FIG. 2 includes a summary of the test results of tensile stress at break in the transversal and extrusion directions (indicated as TD and ED in FIGS. 2 and 3, respectively). The tensile strength in the extrusion direction of compositions C and D is significantly higher than that of compositions A and B. FIG. 3 includes a summary of the test results of elongations at break in the transversal and extrusion directions. The elongations at break of composition C were approximately 125% in the extrusion direction and 70% in the transversal direction, respectively, while those of composition D were approximately 225% in the extrusion direction and 10% in the transversal direction, respectively. It could be seen that including modified PFA in the mixture of PFA and PEEK could significantly reduce the differences of elongations at break between the extrusion direction and the transversal direction.

Example 3

Adhesive layer samples of compositions A to D in Table 1 were formed all having the same thickness of 30 microns and subjected to the T-peel tests for measuring peel strength. Each layer was tested in a 5-layer laminate structure prepared as disclosed herein. Three types of sliding layers were used for testing each adhesive layer composition, and compositions of the sliding layers are included in Table 2. Lamination was performed at 0.5 MPa and 380° C. degrees for 5 minutes to allow bonding between the layers. The T-peel tests were conducted according to ASTM D1876-01. The test results are included in FIG. 4.

TABLE 2

| Sliding Layer | Composition |
| --- | --- |
| 1 | PTFE and carbon and graphite filler |
| 2 | PTFE and glass fiber filer |
| 3 | PTFE and Ekonol filler |

Figure 4:
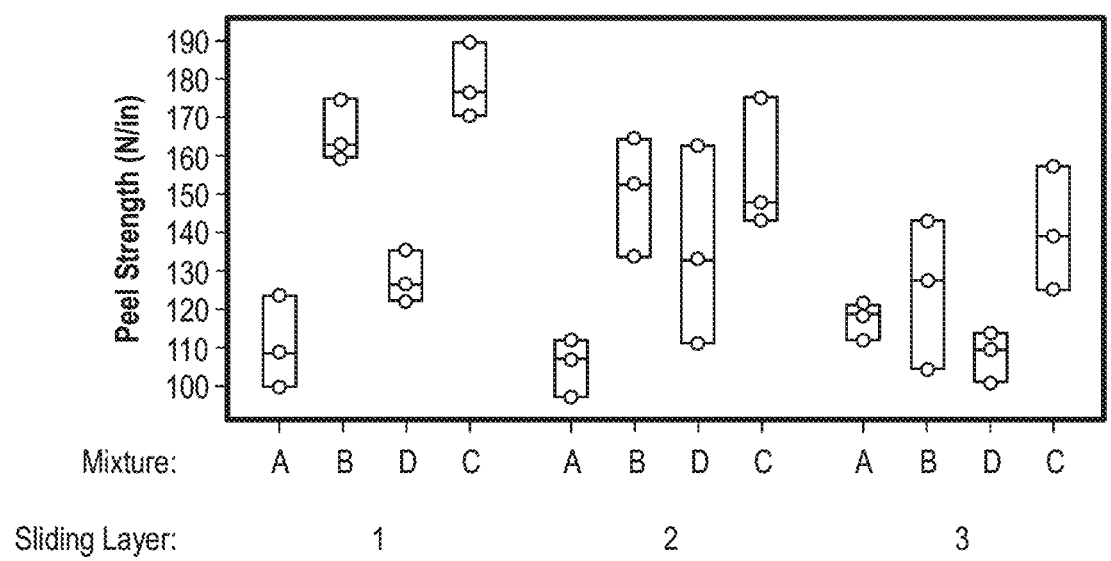
FIG. 4 includes a graph of peel strength of adhesive layers according to embodiments herein and conventional adhesive layers.

As illustrated in FIG. 4, when sliding layer 1 was used, adhesive layers of compositions A, B, and D demonstrated peel strength of approximately 110 N/in, 160 N/in, 125 N/in, respectively, while composition C had peel strength of approximately 175 N/in. For sliding layer 2, compositions A, B, and D demonstrated peel strength of approximately 110 N/in, 155 N/in, 135 N/in, and composition C had peel strength of approximately 150 N/in. For sliding layer 3, peel strength for compositions A, B, and D was approximately 120 N/in, 130 N/in, and 110 N/in, respectively, while composition C had peel strength of 140 N/in. Compared to the mixture of PFA and PEEK, blending PFA and PEEK with modified PFA could improve peel strength of the adhesive layer.

Example 4

Mixtures, C1, C2, S1, and S2 were prepared including the compositions in Table 3 below. A twin-screw compounder was used to blend the polymers to form the mixtures at a temperature of 300° C. to 315° C. ETFE polymers are obtained from Daikin under the commercial line NEOFLON™, PESU from Solvay S.A., and mETFE from Asahi, and EFEP from Daikin under the commercial name of RP5000.

TABLE 3

| Mixture | Composition |
| --- | --- |
| C1 | 100 wt. % ETFE |
| C2 | 90 wt. % ETFE |
|  | 10 wt. % PESU |
| S1 | 85.5 wt. % ETFE |
|  | 9.5 wt % PESU |
|  | 5 wt. % mETFE |
| S2 | 85.5 wt. % ETFE |
|  | 9.5 wt % PESU |
|  | 5 wt. % EFEP |

Figure 5:
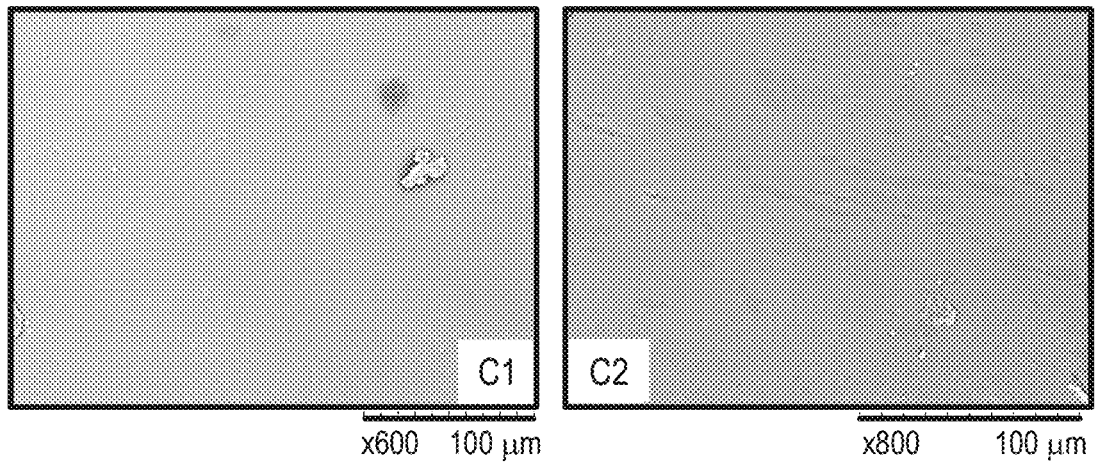
FIG. 5 includes images of different samples according to embodiments.
Figure 5:
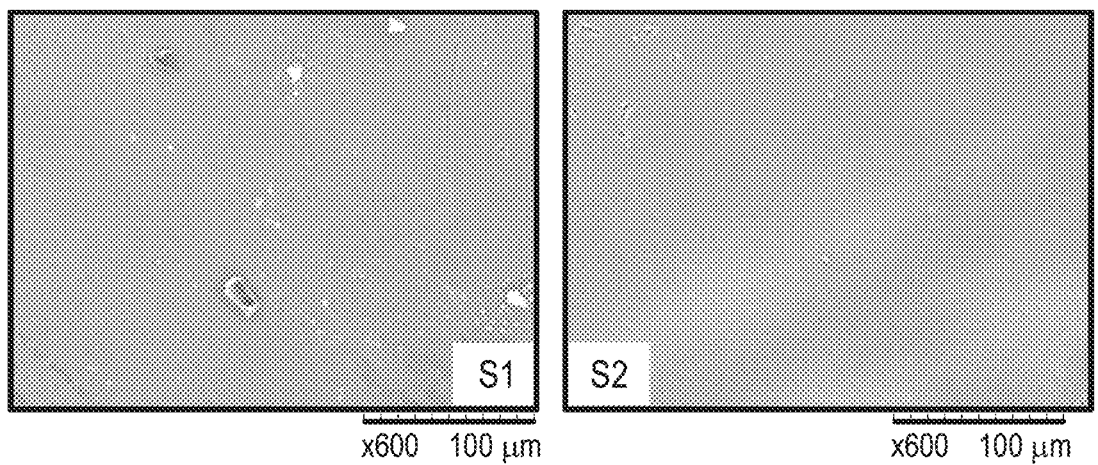

FIG. 5 includes scanning electronic microscopic images of the mixtures. As illustrated, the presence of mETFE or EFEP helps to improve the dispersion of PESU compared to C2.

Example 5

Figure 6:
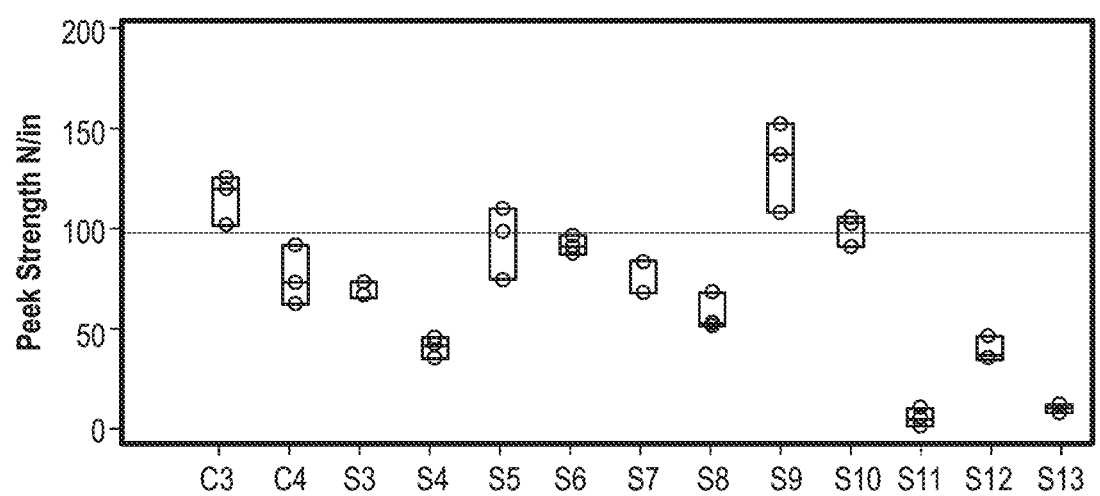
FIG. 6 includes an illustration of peel strength for different samples disclosed in embodiments herein.

Adhesive layer samples having the compositions included in Table 4 were formed. The polymers, mETFE, ETFE, and PESU, are obtained from the same suppliers noted in Example 4. LCP is obtained from Ticona, polyketone from Hyosung, and BA11x from Auserpolimeri S.R.L. The mixture for each adhesive layer was formed using a twin-screw compounder at 300° C. to 315° C. and then cut into small pellets. The resulted pellets were extruded into films of 30 μm thick using a single screw extruder. Each adhesive layer was subjected to the T-peel tests for measuring peel strength in a 5-layer laminate structure prepared as disclosed herein. Lamination was performed at 0.5 MPa and 315° C. degrees for 5 minutes to allow bonding between the layers. The T-peel tests were conducted according to ASTM D1876-01, and results are illustrated in FIG. 6.

TABLE 4

| Sample | Composition |
| --- | --- |
| C3 (Conventional) | 100 wt. % mETFE |
| C4 | 100 wt. % ETFE |
| S3 | 90 wt. % ETFE and 10 wt. % LCP |
| S4 | 80 wt. % ETFE and 20 wt. % LCP |
| S5 | 85.5 wt. % ETFE, 9.5 wt. % LCP and 5 wt. % mETFE |
| S6 | 76 wt. % ETFE, 19 wt. % LCP and 5 wt. % mETFE |
| S7 | 90 wt. % ETFE and 10 wt. % PESU |
| S8 | 80 wt. % ETFE and 20 wt. % PESU |
| S9 | 85.5 wt. % ETFE, 9.5 wt. % PESU and 5 wt. % mETFE |
| S10 | 76 wt. % ETFE, 19 wt. % PESU and 5 wt. % mETFE |

TABLE 4-continued

| Sample | Composition |
| --- | --- |
| S11 | 90 wt. % ETFE and 10 wt. % PET |
| S12 | 90 wt. % ETFE and 10 wt. % polyketone |
| S13 | 89.1 wt. % ETFE, 9.9 wt. % polyketone and 1 wt. % BA11x |

As illustrated in FIG. 6, the threshold for peel strength is 100 N/in, and Samples S5, S9, and S10 meet the peel strength criteria, and Sample S9 demonstrated better peel strength compared to conventional Sample C3.

Example 7

Adhesive layer sample S14 was prepared having the composition included in Table 5 below. The ETFE, PESU, and EFEP polymers were obtained from the same suppliers as noted in Example 4. Samples were formulated using a twin-screw compounder at 300° C. to 315° C. and then cut into small pellets. The resulted pellets were then extruded into films of 30 μm thick. Samples S9 and S14 were subjected to the same test to determine the elongation at break and tensile stress at break in the transversal and extrusion directions. At least 4 tensile testing strips were cut from the corresponding, extruded adhesive film sample in both extrusion direction and transversal directions.

TABLE 5

| Sample | Composition |
| --- | --- |
| S14 | 85.5 wt. % ETFE, 9.5 wt. % PESU and 5 wt. % EFEP |

Figure 7A:
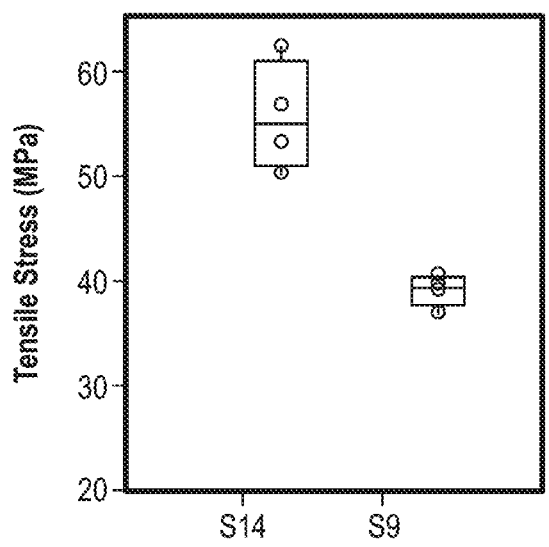
FIGS. 7A to 7D include illustrations of tensile stress of elongation at break for different samples disclosed in embodiments herein.
Figure 7B:
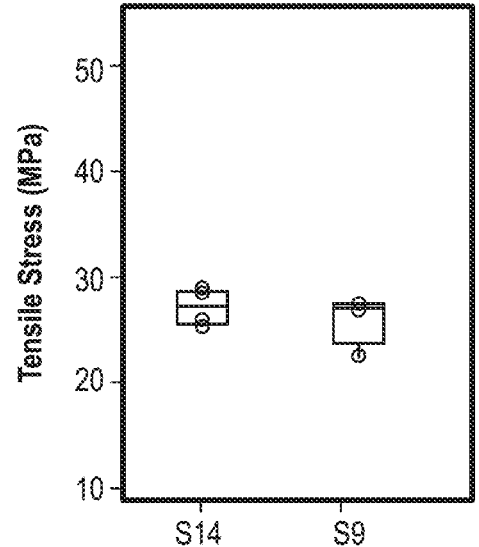
Figure 7C:
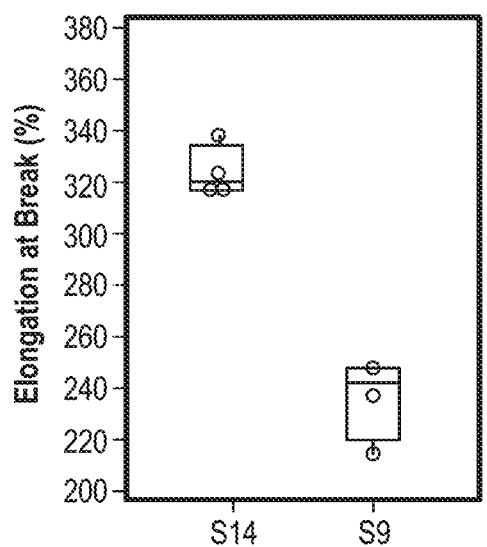
Figure 7D:
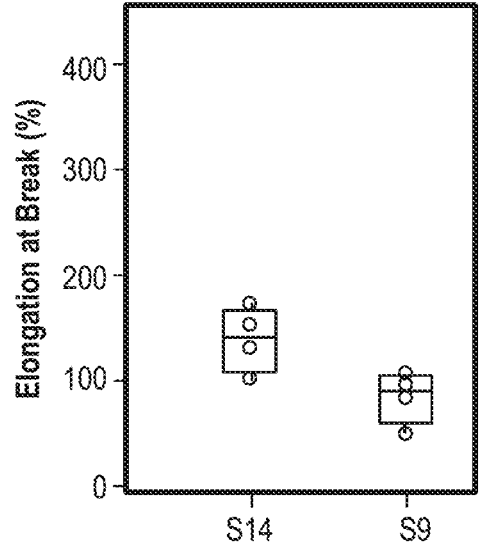

As illustrated in FIGS. 7A and 7C, in the extrusion direction, the tensile stress of Samples S14 and S9 is about 54 MPa and 40 MPa, respectively, and the elongation at break is about 320% and 240%, respectively. In the transversal direction, the tensile stress of S14 and S9 is similar, about 29 MPa, and the elongation at break is about 140% and 100%, respectively, as illustrated in FIGS. 7B and 7D.

Embodiments disclosed herein represent a departure from the state of the art. The adhesively layer of embodiments herein can include a first polymer, a second polymer including ETFE, and a third polymer including mETFE, EFEP, or a combination thereof. Particularly, the polymers can be present in certain contents and/or at ratios relative to each other. The compositions noted in embodiments of this disclosure facilitate improved formation and properties of the adhesive layer. Moreover, the content of the third polymer can be adjusted to achieve a desired property of the adhesive layer. Unexpectedly, adding the third polymer to the first and second polymers, even at a weight content at most 10 wt. %, can improve dispersion of the polymers, allowing formation of the adhesive layer with improved properties (e.g., peel strength, elongation at break in the transversal direction). Furthermore, by selecting melt flow rates and adjusting the weight contents of the polymers, the resulted adhesive layer can have various complex viscosities to allow the adhesive layer to be suitable for different applications.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A bearing, comprising:
   a substrate layer comprising metal; and
   an adhesive layer disposed directly over the substrate layer,
   wherein the adhesive layer is a single layer comprising a mixture including:
      a first polymer, wherein the first polymer is not a fluoropolymer;
      a second polymer comprising ethylene tetrafluoroethylene (ETFE); and
      a third polymer comprising a modified ethylene tetrafluoroethylene (mETFE), an ethylene tetrafluoroethylene hexafluoropropylene (EFEP), or a combination thereof; and
   wherein the adhesive layer has at least one characteristic selected from the group consisting of:
      a melting temperature that is at least 20° C. higher than a melting temperature of the third polymer;
      a tensile stress in an extrusion direction of at least 30 MPa;
      a tensile stress in a transversal direction of at least 20 MPa; and
      a melting temperature that is at most 330° C.

2. The bearing of claim 1, wherein the first polymer comprises polyethersulfone (PESU), polyphenylene sulfide, polyphenylsulfone, or a combination thereof.

3. The bearing of claim 1, wherein the adhesive layer comprises a ratio of a weight content of the second polymer to a weight content of the first polymer from 4:1 to 12:1.

4. The bearing of claim 3, wherein the adhesive layer comprises a ratio of a weight content of the second polymer to a weight content of the third polymer from 10:1 to 110:1.

5. The bearing of claim 1, wherein the adhesive layer comprises a ratio of a weight content of the first polymer to a weight content of the third polymer from 1:1 to 50:1.

6. The bearing of claim 1, wherein the ethylene tetrafluoroethylene (ETFE) is present in the adhesive layer in a content from 60 wt. % to 96 wt. %.

7. A bearing, comprising a substrate comprising metal and an adhesive layer disposed directly over the substrate, wherein the adhesive layer is a single layer and comprises:
   a first polymer, wherein the first polymer is not a fluoropolymer;
   a second polymer comprising ethylene tetrafluoroethylene (ETFE); and
   a third polymer comprising a modified ethylene tetrafluoroethylene (mETFE), an ethylene tetrafluoroethylene hexafluoropropylene (EFEP), or a combination thereof; and
   wherein:
      the first polymer has a first content of at most 25 wt. % relative to a total weight of the adhesive layer;
      the second polymer has a second content of at least 60 wt. % of the total weight of the adhesive layer; and
      the third polymer has a third content of at most the first content.

8. The bearing of claim 7, wherein the first polymer comprises an aromatic group, a sulfone group, an ether group, or a combination thereof, and wherein the adhesive layer comprises a ratio of a weight content of the second polymer to a weight content of the first polymer from 4:1 to 12:1.

9. The bearing of claim 7, wherein the first polymer comprises polyethersulfone (PESU), polyphenylene sulfide, polyphenylsulfone, or a combination thereof.

10. The bearing of claim 7, wherein the first polymer is present in the adhesive layer in a content from 3 wt. % to 25 wt. % for the total weight of the adhesive layer.

11. The bearing of claim 7, wherein the third polymer is present in the adhesive layer in a content of at most 15 wt. % for the total weight of the adhesive layer.

12. The bearing of claim 7, wherein the modified ethylene tetrafluoroethylene (mETFE) is present in the adhesive layer in a content of at least 1 wt. % and at most 10 wt. % for the total weight of the adhesive layer.

13. The bearing of claim 7, wherein the ethylene tetrafluoroethylene hexafluoropropylene (EFEP) is present in the adhesive layer in a content of at least 1 wt. % and at most 10 wt. % for the total weight of the adhesive layer.

14. The bearing of claim 7, wherein the adhesive layer is disposed between a substrate layer and a sliding layer of the bearing.

15. A bearing, comprising:
   a substrate layer comprising metal;
   a sliding layer; and
   an adhesive layer directly disposed between the sliding layer and the substrate layer,
   wherein the adhesive layer is a single layer and comprises:
      a first polymer comprising a sulfone group, an ether group, or a combination thereof;
      a second polymer comprising ethylene tetrafluoroethylene (ETFE), wherein a ratio of a weight content of the second polymer to a weight content of the first polymer is from 4:1 to 12:1; and
      a third polymer comprising a modified ethylene tetrafluoroethylene (mETFE), an ethylene tetrafluoroethylene hexafluoropropylene (EFEP), or a combination thereof; and
   wherein the adhesive layer has at least one characteristic selected from the group consisting of:
      a melting temperature that is at least 20° C. higher than a melting temperature of the third polymer;
      a tensile stress in an extrusion direction of at least 30 MPa;

a tensile stress in a transversal direction of at least 20 MPa; and a melting temperature that is at most 330° C.

16. The bearing of claim 15, wherein the first polymer comprises polysulfone.

17. The bearing of claim 15, wherein the modified ethylene tetrafluoroethylene (mETFE) comprises a functional group comprising a hydroxyl group (—OH), a carbonyl fluoride (—COF), a carboxyl group (—COOH), a maleic anhydride group (—(CHCO)$_2$O), an acrylate group (—CH$_2$=CHCOOH), a glycidyl methacrylate group (—CH$_2$C(CH$_3$)COOCH$_2$(CHCH$_2$O)), or a combination thereof.

18. The bearing of claim 15, wherein the adhesive layer comprises a mixture of the first polymer, the second polymer, and the third polymer.

19. The bearing of claim 18, wherein the first polymer comprises polyethersulfone, polyphenylene sulfide, polyphenylsulfone, or a combination thereof.

20. The bearing of claim 19, wherein the first polymer is present in the adhesive layer in a content from 3 wt. % to 25 wt. % for the total weight of the adhesive layer, the second polymer is present in the adhesive layer in a content of at least 60 wt. % and at most 96 wt. % for the total weight of the adhesive layer, and the third polymer is present in the adhesive layer in a content from 1 wt. % to 15 wt. % for the total weight of the adhesive layer.

* * * * *